(12) United States Patent
Dybenko et al.

(10) Patent No.: US 8,360,718 B2
(45) Date of Patent: Jan. 29, 2013

(54) FAN INLET AND METHOD

(75) Inventors: Jesse T. Dybenko, Cupertino, CA (US); Frank Liang, San Jose, CA (US); Amaury J. Heresztyn, Cupertino, CA (US); Brett W. Degner, Menlo Park, CA (US); Thomas W. Wilson, Jr., Saratoga, CA (US); Peteris K. Augenbergs, San Francisco, CA (US); Connor R. Duke, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 513 days.

(21) Appl. No.: 12/696,920

(22) Filed: Jan. 29, 2010

(65) Prior Publication Data

US 2011/0189004 A1    Aug. 4, 2011

(51) Int. Cl.
F04D 29/44 (2006.01)
F04D 29/58 (2006.01)

(52) U.S. Cl. .......... 415/206; 415/203; 415/204

(58) Field of Classification Search ........... 415/206, 415/203, 204, 212.1, 182.1
See application file for complete search history.

(56) References Cited

U.S. PATENT DOCUMENTS

| 6,637,501 | B2 | 10/2003 | Lin et al. |
| 6,884,033 | B2 | 4/2005 | Liao |
| 7,206,724 | B2 * | 4/2007 | Chen ................. 703/1 |
| 2005/0074332 | A1 | 4/2005 | Adamski et al. |
| 2006/0292020 | A1 | 12/2006 | Hwang et al. |
| 2008/0107523 | A1 * | 5/2008 | Chen et al. .......... 415/206 |

* cited by examiner

*Primary Examiner* — Ninh H Nguyen
*Assistant Examiner* — William Grigos
(74) *Attorney, Agent, or Firm* — Womble Carlyle Sandridge & Rice LLP

(57) ABSTRACT

A method and apparatus to improve air flow in an air circulating fan assembly by forming an inlet opening in a fan assembly. A static air pressure profile is calculated along a top portion of the fan assembly configured to operate in an enclosure. The shape of a section of the inlet opening in the top portion of the fan assembly is changed based on a pressure contour of the calculated static air pressure profile. The method is repeated iteratively one or more times using an inlet opening changed by a previously calculated static air pressure profile when calculating a subsequent static air pressure profile. The inlet opening is positioned in the top surface of the fan assembly so that the centroid of the inlet opening is laterally offset with respect to the rotational axis of an impeller in the fan assembly.

20 Claims, 6 Drawing Sheets

FAN INLET AND METHOD

TECHNICAL FIELD

The presently described embodiments relate generally to air circulation devices. More particularly, a method for forming an air inlet for a fan to improve air flow through the fan is described.

BACKGROUND OF THE INVENTION

The performance of computational components and storage devices in computing systems, such as personal computers and rack mounted servers, require effective cooling mechanisms to ensure that the components and devices used inside operate in a preferred temperature range. The operational stability of central processing units (CPUs), video processing units, memory and storage devices, for example, can be adversely affected by heat accumulation within enclosed spaces in which they are housed, such as encountered in relatively thin notebook computers. With each newly introduced computing system, the performance of components used internally are being increased, while simultaneously, the dimensions of the external enclosure that houses the computing system are being decreased, thereby challenging the computer system designers to devise more efficient cooling methods. The narrow height dimensions of portable computer housings can require more efficient cooling methods than can be provided by thermal conduction alone or even when combined with conventional air circulation fan designs.

Air circulation fans within computing systems can include axial fans that move air parallel to the rotational axis of the fan's impeller and centrifugal fans that blow air through an outlet perpendicular to an air inlet opening. Several geometric properties of a centrifugal fan's shape can affect its air flow performance, including the size, shape and orientation of the air inlet opening through which air is drawn when rotating the fan's impeller. In a typical prior art centrifugal fan, a circular inlet opening in the fan's housing is positioned concentric with the rotational axis of an impeller situated inside the fan housing. Increasing the diameter of the circular inlet opening beyond a certain size can decrease air flow (rather than increase it as intended) due to air being expelled upward from the rotating impeller blades and thereby forcing some air out of the inlet opening rather than drawing air in. Prior art methods have designed variously shaped inlet openings for centrifugal fans to change the fan's air flow. Such ad hoc methods can change the air flow but not necessarily maximize the flow rate through the fan in its intended application. None of the prior art methods known to the applicants have systematically designed the inlet opening according to calculated pressure contour profiles on the fan housing's surface operating in situ. Thus there exists a need for an improved method to form an inlet opening in a cooling fan to maximize flow rate.

SUMMARY OF THE DESCRIBED EMBODIMENTS

This paper describes various embodiments that relate to methods and apparatus to improve air flow and increase flow rate in an air circulating fan assembly. In described embodiments, a method for forming an inlet opening in a fan assembly's housing is described. The method comprises calculating a static air pressure profile along a top portion of the fan housing configured to operate in an enclosure and changing the shape of a section of the inlet opening in the top portion of the fan housing based on a pressure contour of the calculated air pressure profile. The fan assembly includes an impeller mounted on a bottom portion of the fan housing, a housing sidewall perpendicular to the bottom portion and enclosing the fan assembly to form an outlet opening along one side, and the top portion of the fan housing having an inlet opening perpendicular to the outlet opening and positioned over the impeller. In some embodiments, the method can be repeated iteratively one or more times using an inlet opening changed by a previously calculated static air pressure profile when calculating a subsequent static air pressure profile. In some embodiments, the fan assembly is a centrifugal fan.

In an embodiment, the centroid of the changed inlet opening is displaced laterally from a rotational axis of the impeller in the air circulating fan assembly. The changed inlet opening can be a non-circular, smoothly convex geometric curve with no discontinuities or corner bends. In some embodiments the interior surface of the fan assembly's housing sidewall can follow a smoothly convex geometric curve, also with no discontinuities or corner bends.

In another embodiment, an air circulating fan assembly is described. The air circulating fan assembly comprises an impeller mounted on a bottom portion of a housing of the fan assembly, a housing sidewall perpendicular to the bottom portion and enclosing the fan assembly to form an outlet opening along one side, and a top portion of the fan housing having an inlet opening perpendicular to the outlet opening and positioned over the impeller. The shape of a section of the inlet opening in the top portion of the fan housing is based on a pressure contour of a calculated static air pressure profile along the top portion of the fan housing when configured to operate in an enclosure. In an embodiment, the shape of the inlet opening in the fan housing is determined by using a previously determined inlet opening when calculating a subsequent static air pressure profile along the top portion of the fan housing. Preferably the fan assembly is a centrifugal fan.

In a further embodiment, the centroid of an inlet opening in the top portion of a fan housing is displaced laterally from a rotational axis of the impeller. The shape of the inlet opening can be a non-circular, smoothly convex, arc-shaped geometric curve with no discontinuities or corner bends. In some embodiments the interior surface of the fan assembly's housing sidewall can follow a smoothly convex geometric curve, also with no discontinuities or corner bends.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

Figure 1A:
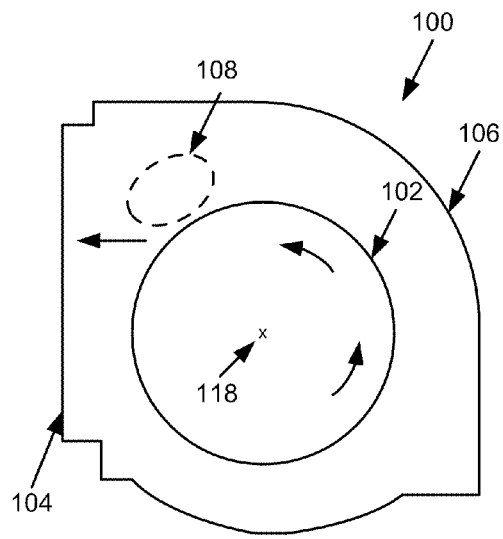
FIG. 1A illustrates an outline of a prior art air circulating fan housing having a circular inlet opening.

The presently described embodiments relate generally to cooling devices. More particularly, a method for forming an air inlet for a cooling fan to improve air flow through the cooling fan is described.

In the following description, numerous specific details are set forth to provide a thorough understanding of the presently described embodiments. It will be apparent, however, to one skilled in the art that the presently described embodiments may be practiced without some or all of these specific details. In other instances, well known process steps have not been described in detail in order to avoid unnecessarily obscuring the presently described embodiments.

Increasingly, portable electronic devices can use more powerful processing and storage components while simultaneously continuing to shrink in overall size. Personal notebook computers, in particular, can have small vertical height dimensions in which embedded components can be fitted. Cooling devices, including fans and mechanical heat spreaders, can be used to dissipate heat accumulated at and near powerful, heat generating processing and storage components. Significant air flow through fans enclosed in notebook computers can adequately cool internal components. Optimizing the air flow rate through fans in situ can prove challenging, as increasing an embedded fan's impeller blade height or diameter can be prohibited by space restrictions imposed by structures around the fan, such as a narrow height notebook computer base.

The size and shape of an inlet opening in a fan assembly's housing through which air can be drawn by a fan assembly's impeller can significantly affect the air flow rate of the fan assembly. Typically, prior art fans can use circular inlet openings positioned concentric to the rotational axis of the fan's impeller. The circular inlet opening shape can result in sub-optimal airflow through the fan. This sub-optimality can be due to the asymmetric shape of the fan assembly's housing and to the different air velocities generated in the fan assembly as the air circulates from the inlet opening to the outlet opening. A fixed, generic circular shaped inlet opening can also not account for a position of the outlet opening at the edge of the fan assembly nor consider the shape of an enclosure surrounding the fan assembly in which the fan assembly can operate. As such, a sub-optimal fan assembly using a generic circular opening can produce less air flow than a fan assembly with openings based on simulations of air flow in a typical operational environment.

Simulations of a representative fan assembly, which includes an impeller and a fan housing, in a surrounding enclosure show that isobaric pressure contours of a static air pressure profile on the surface of the fan housing can be non-circular around a circular inlet opening. By changing the shape of the fan housing's inlet opening to account for calculated negative pressure contours, particularly in an area nearer to the fan housing's outlet opening, the fan assembly can provide greater air flow. The simulation can be repeated iteratively by using a fan housing inlet opening determined based on a previous calculation as a starting point to calculate a new static air pressure profile in a subsequent calculation. For example, an initial fan housing inlet opening can have a circular shape. An air pressure profile can be calculated on the surface of the fan housing using the circular inlet opening. The air pressure profile can be used to adjust the fan housing's inlet opening. The simulation can be repeated using the adjusted fan housing's inlet opening. In some embodiments the fan housing's inlet opening shape can be a non-circular, smoothly convex curve, for example an elliptical or ovate shape. Each segment of the inlet opening can have an arc shape. An absence of sharp corner transitions in the fan inlet opening shape can reduce air flow disturbances that can disrupt the smooth air intake through the fan housing's inlet opening and cause turbulence. Preferably the centroid of the fan housing's inlet opening can be laterally displaced from (not concentric with) the rotational axis of the impeller. Lateral displacement can shift the centroid of the fan housing's inlet opening closer to a point on the fan housing's outlet opening at which maximum air flow velocity within the fan assembly can occur. The shape of a housing sidewall of the fan assembly and the distance between the impeller blade ends and an interior surface of the housing sidewall can also influence the fan assembly's air circulation. At least a major portion of the housing sidewall can be smoothly convex to reduce obstructions to the air flow and decrease air turbulence within the fan assembly. In some embodiments the distance between the fan's impeller blades and the interior surface of the housing side wall can increase steadily as the air flow accelerates inside the fan housing before exiting the fan housing's outlet opening.

Centrifugal fans can provide greater airflow than axial fans when placed in a limited height enclosure. The narrow vertical dimensions of a notebook computer base, in which several heat sensitive components can be mounted horizontally along the computer base, can limit the effectiveness of axial fans mounted horizontally to blow air perpendicular to the computer base. While an axial fan can be mounted directly on a heat sensitive component, such as a central processing unit (CPU), the notebook computer base can often not include an opening through which to expel heated air. In addition, the narrow height of the base can restrict the use of an axial fan mounted vertically because the resulting fan size can be insufficient to create desired air flow. Instead, centrifugal fans can preferably be used to move air parallel to the notebook computer base across one or more components and heat spreader devices mounted therein.

FIG. 1A illustrates an outline of a prior art centrifugal fan assembly 100 including an outer fan housing 106 with a circular inlet opening 102 through which air can be drawn in. An outlet opening 104 in the outer fan housing 106 is positioned perpendicular to the circular inlet opening 102. A rotational axis of an impeller (not shown) of the centrifugal fan assembly 100 can be positioned at the center 118 of the circular inlet opening 102, with the impeller rotating counter-clockwise drawing air into the inlet opening 102 and expelling air out from the outlet opening 104. Computational fluid dynamics simulations of a fan assembly structurally similar to fan assembly 100 reveal that air pressure contours in a simulated static air pressure profile along the top surface of fan housing 106 can be non-circular around the fan inlet opening 102. In particular an area of negative pressure 108, relative to atmospheric pressure, can be located at one side of the inlet opening closest to the outlet opening 104, where the air flow reaches greatest velocity before being expelled from the fan assembly 100. Negative pressure can indicate that opening the fan housing 106 in the area 108 can result in additional air flow into the fan assembly 100. Based on the Bernoulli principle, higher velocity of a fluid can be associated with lower pressure, i.e. an increase in velocity of fluid flow can result in a decrease in static pressure. Thus there is potential to draw more air into fan assembly 100 near high velocity areas, prompting one to add openings in such areas of lower pressure.

Figure 1B:
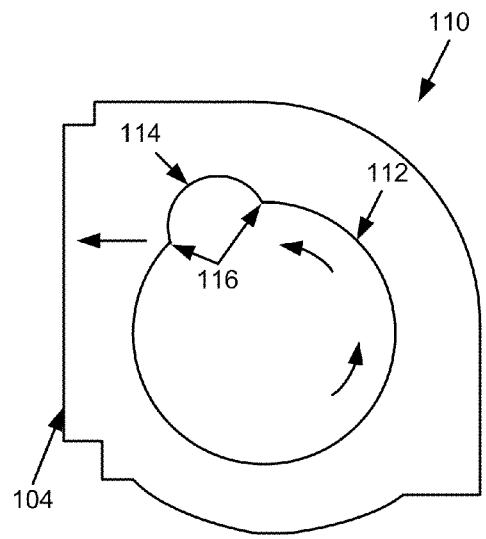
FIG. 1B illustrates an outline of a prior art air circulating fan housing having a circular inlet opening augmented by an additional half circular opening.
Figure 1C:
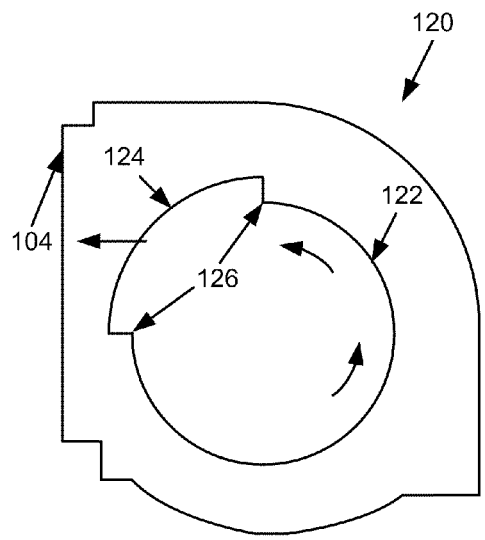
FIG. 1C illustrates an outline of a prior art air circulating fan housing having a circular inlet opening increased by an arc opening.
Figure 1D:
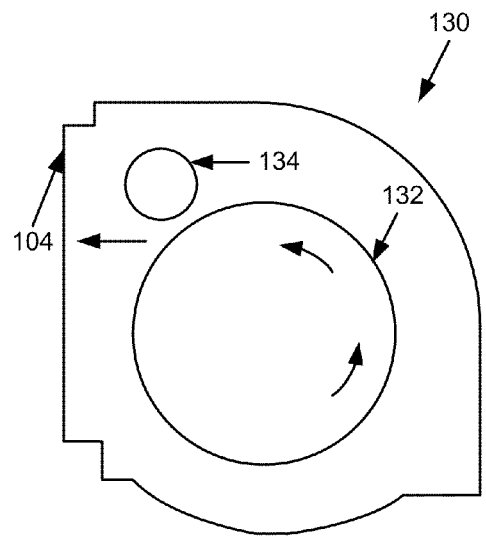
FIG. 1D illustrates an outline of a prior art air circulating fan housing having two circular inlet openings.

FIG. 1B illustrates an outline of a prior art centrifugal fan assembly 110 that includes an inlet opening 112 formed from a circular opening augmented by a semi-circular opening 114 in an area of expected negative air pressure. While the semi-circular opening 114 can be simple to devise and manufacture, it can result in sub-optimal airflow as undesirable discontinuities 116 at the boundary where the supplemental semi-circular opening 114 meets the main inlet opening 112 can affect fan air flow performance. FIG. 1C illustrates another outline of a prior art centrifugal fan assembly 120 that includes an inlet opening 122 augmented by an arc opening 124 that also includes sharp corners 126 that can disrupt airflow and increase acoustic noise. FIG. 1D illustrates yet another outline of a prior art centrifugal fan assembly 130 that includes a circular inlet opening 132 centered over an impeller (not shown) supplemented by a second circular inlet opening 134 nearer to the outlet opening 104. While the inlet openings 132 and 134 in the fan assembly 130 do not include sharp discontinuities, the opening can also be less than optimal. Each of the prior art inlet openings can be designed in an ad-hoc manner rather than by considering the actual (or simulated) air pressure field that can occur on a fan housing's top surface when operating the fan assembly in an intended enclosure.

Figure 2A:
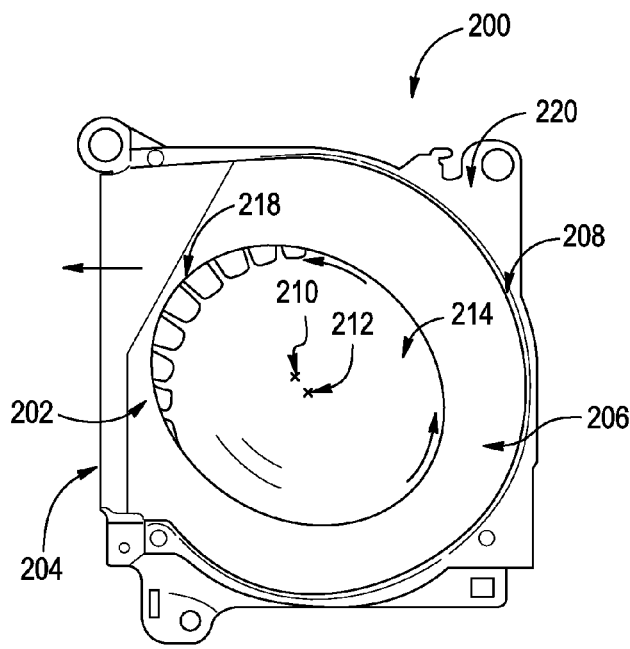
FIG. 2A illustrates an air circulating fan assembly having an elliptical inlet opening in the fan housing offset from the rotational axis of an impeller.
Figure 2B:
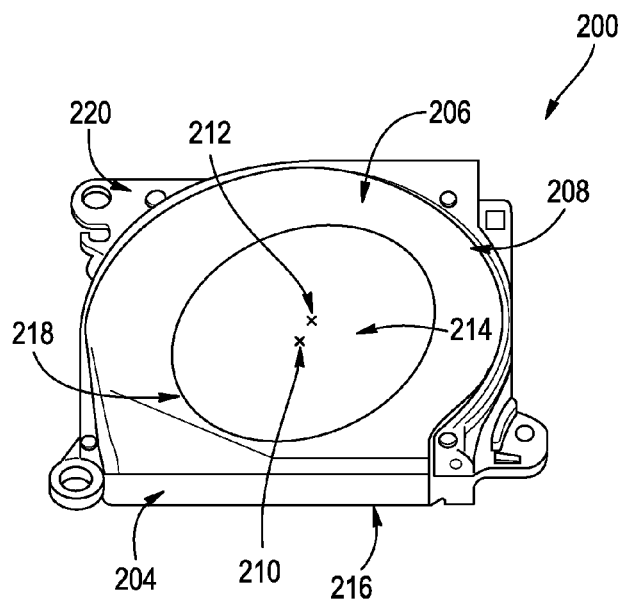
FIG. 2B illustrates a second view of the air circulating fan assembly of FIG. 2A.

FIGS. 2A and 2B illustrate a representative embodiment of a fan assembly 200 including an impeller 214 mounted inside a housing. The housing of the fan assembly 200 can include a bottom surface portion 216, which together with the top surface 206 can form the outlet opening 204, and a mounting portion 220 by which to fix the fan assembly 200 in an enclosure during use. A non-circular inlet opening 202 can be formed in the top surface portion 206 of the housing of the fan assembly 200. The non-circular inlet opening 202 can have a smoothly convex shape with no sharp discontinuities that are used in prior art fans. Each segment of the non-circular inlet opening 202 can have an arc shape. The impeller 214 can rotate counter-clockwise drawing air into the inlet opening 202 of the fan assembly 200, accelerating the air along a curved path, and expelling the accelerated air through an outlet opening 204 of the fan assembly 200. The inlet opening 202 can be elliptically shaped having a centroid 210 offset laterally from a rotational axis 212 of the impeller 214. By offsetting the elliptical inlet opening 202, a portion of the inlet opening 218 near the outlet opening 204 can align more closely with a pressure contour of a simulated static air pressure profile on the top surface portion 206 of the fan assembly 200 than a circular opening would. The enlarged inlet opening 202 can be positioned so that the expanded portion 218 is above an area of higher air velocity or equivalently lower static air pressure. An interior curved side wall 208 of the housing of the fan assembly 200 can be formed as a smoothly convex shape along which the air can accelerate uniformly as it circulates within the fan assembly 200 before being expelled through the outlet opening 204. Fan assemblies that include angled bends (or discontinuities) along an interior side wall of the fan housing can cause undesirable air recirculation near the bends that can lower fan assembly's air flow performance, so a fan housing having a smooth interior side wall surface is preferred. In some embodiments, the inlet opening 202 can be sized and positioned relative to the impeller 214 so that the inlet opening 202 does not extend beyond the tips of the impeller's blades. Too large an inlet opening 202 can result in some air being expelled out from the inlet opening 202 rather than being expelled out from the outlet opening 204. Positioning the edge of the inlet opening 202 relative to the fan's impeller blades can also affect the acoustical properties of the fan assembly when in use.

Figure 3:
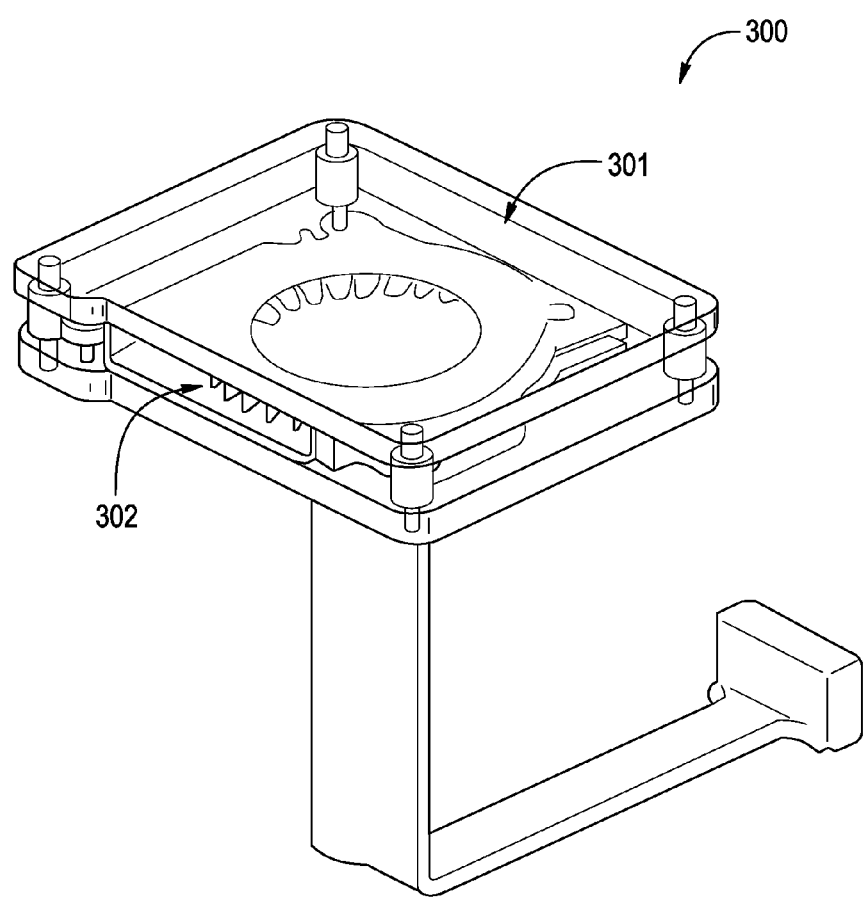
FIG. 3 illustrates a simulation environment for an air circulating fan assembly positioned in an enclosure.

FIG. 3 illustrates a simulation platform 300 that includes a simulated enclosure 301 surrounding a simulated centrifugal fan assembly 302, which can be used to calculate air pressure contour profiles along the top surface portion of a housing of the fan assembly 302 when operating in the enclosure 301. Different fan housing shapes and inlet openings therein can be simulated to determine an optimal inlet opening for maximizing air flow associated with a particular fan housing shape when operating in a surrounding enclosure. Air pressure profile simulation results for an exemplary fan assembly simulation platform 300 are shown in FIGS. 4A and 4B.

Figure 4A:
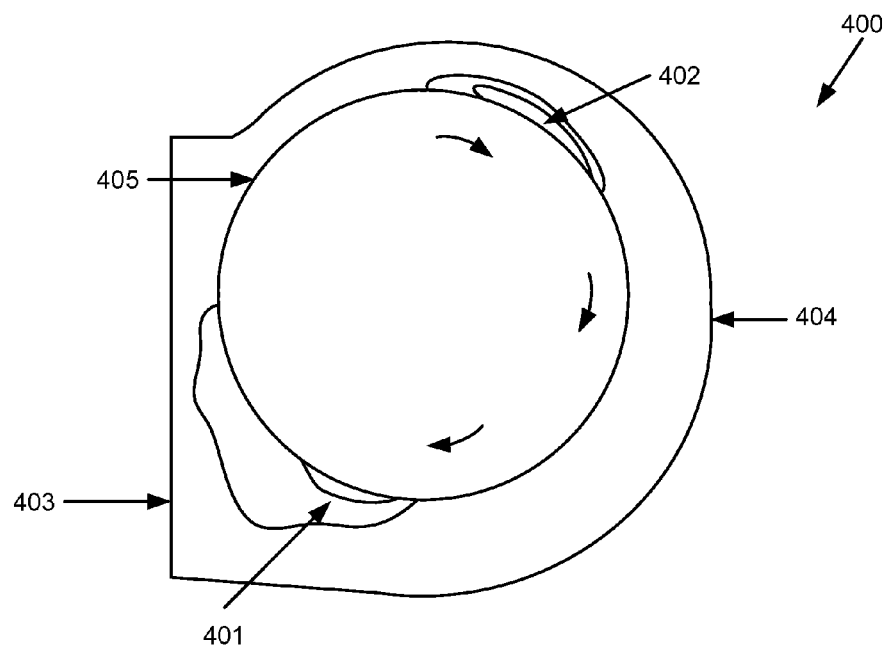
FIG. 4A illustrates a simulated air pressure profile on the top surface of an air circulating fan assembly housing with regions of negative air pressure contours.
Figure 4B:
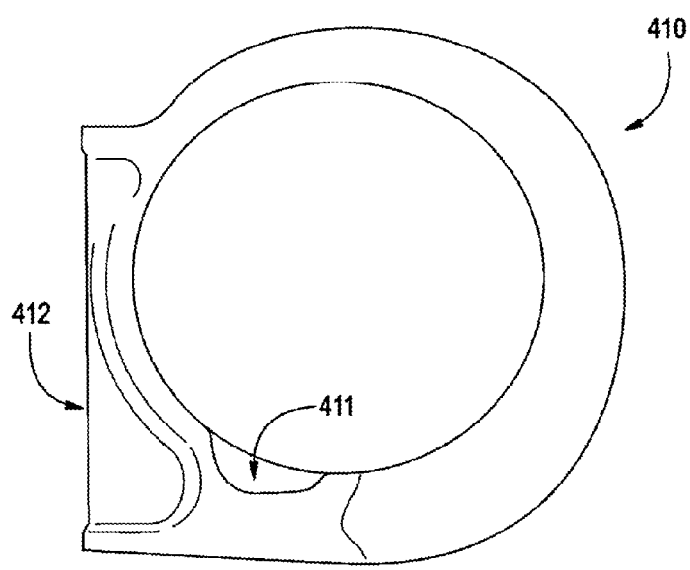
FIG. 4B illustrates a second simulated air pressure profile on the top surface of an air circulating fan assembly housing with regions of negative air pressure contours.

FIG. 4A illustrates a static air pressure profile 400 of a fan housing containing a number of isobaric pressure contours simulated to occur on the top surface of a fan housing having a circular inlet opening 405. A first area of significant negative air pressure 401 can be located near to the outlet opening 403. Expanding the inlet opening of the fan housing in the area of significant negative air pressure can alter the amount of air expelled from the fan housing. (Air pressure is considered "negative" with respect to ambient atmospheric pressure.) A second area of negative air pressure 402 can occur on the top surface of the fan housing opposite to the first area 401; however this second area 402 can be an artifact of a sub-optimal fan housing side wall 404. The first negative air pressure area 401 can provide the best opportunity to change the shape the inlet opening 405 to improve air circulation through the fan housing. Further static air pressure profile simulations 400 of a fan housing with an inlet opening 405 expanded into a portion of the first area 401 can confirm increased air flow due to changing the inlet opening shape. FIG. 4B illustrates a similar simulated fan housing's static air pressure profile 410 with a region of significant negative air pressure 411 near the fan housing's outlet opening 412. (Note that the illustrations in FIGS. 4A and 4B have a mirror image orientation with respect the illustrations shown in FIGS. 2A, 2B and 3, so that air circulates clockwise in the fan housings of FIGS. 4A and B.)

Figure 5A:
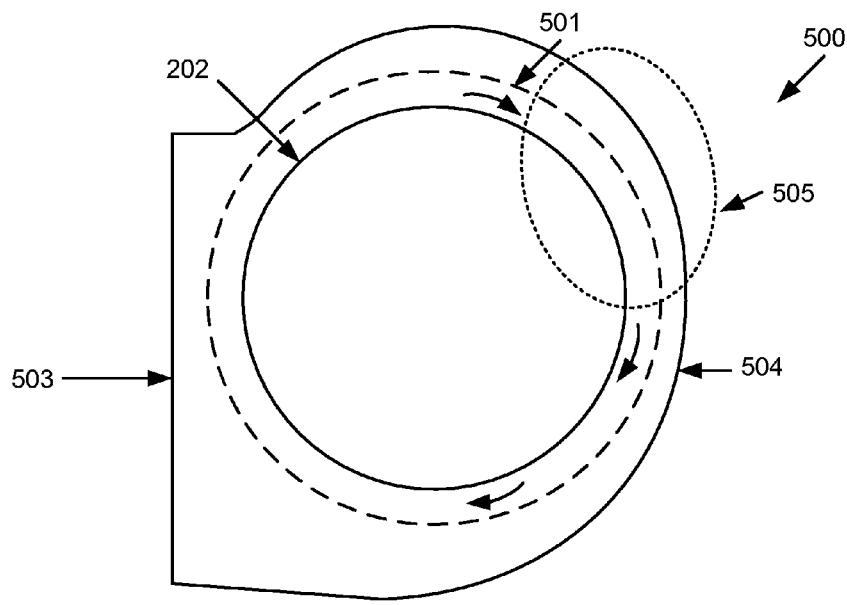
FIG. 5A illustrates an outline of an air circulating fan assembly indicating an impeller blade region having a portion of decreasing distance relative to the fan assembly housing's interior side wall.
Figure 5B:
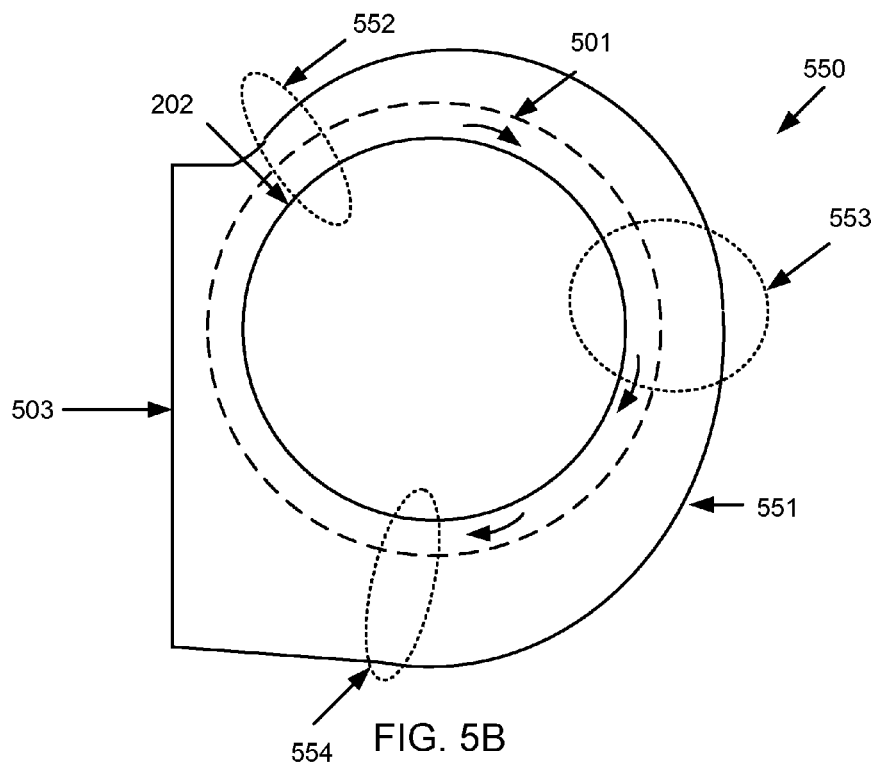
FIG. 5B illustrates an outline of an air circulating fan assembly indicating an impeller blade region having an increasing distance relative to the fan assembly housing's interior side wall.

FIG. 5A illustrates a fan assembly design 500 where the outer edge of the fan assembly's rotating impeller blades (depicted by the dashed circle 501) decrease in distance to the fan housing's side wall 504 in the middle of the air circulation path (in the region 505). The interior surface of the housing side wall 504 of the fan assembly 500 can vary in distance to the ends of the fan's impeller blades as the air circulates within the fan assembly. If this distance between the edge of fan blades and the side wall increases smoothly as the air accelerates within the interior of the fan assembly, then a smooth change of decreasing air pressure can occur as the air traverses inside the fan assembly before being expelled from the fan outlet 503. Discontinuities or bends along the interior surface of the side wall can change the air circulation resulting in undesirable re-circulation that disrupts the smooth acceleration of the airflow. As shown in FIG. 5A, the distance between the fan blades' ends 501 and the housing side wall interior 504 increases before and after region 505, but decreases within region 505. (The housing side walls of the fan assembly shown in FIGS. 4A and 4B have a similar non-optimal shape, but the effect is exaggerated in FIG. 5A to illustrate the undesirable property more clearly.) Preferably, in some embodiments, the interior surface of the housing side wall follows a spiral arc shape, while the fan impeller blades follow a circular arc shape. As illustrated by the fan assembly design 550 of FIG. 5B, the impeller blade can be positioned so that the distance would uniformly increase between the ends of the fan impeller blades and the interior of housing side wall 551. The distance between the fan impeller blades and the housing side wall interior is smallest in region 552 and increases steadily inside the housing as the air circulates clockwise through regions 553/554 before exiting through the outlet opening 503.

Simulations of air flow results through a fan housing indicate that changing one or more of the following parameters can affect the air flow: inlet opening shape, size, or position and an interior housing side wall's shape. The inlet opening shape, size and position can affect the air flow most significantly. The inlet opening can be enlarged in areas simulated to have low pressure on the fan housing surface; however, the opening should not be enlarged to the point where air back flow (pushing air out of the inlet opening rather than drawing air into the inlet opening) occurs. Simulations of air pressure profiles can be repeated iteratively starting with a simple circular inlet opening (or any other shape used in a current fan design), calculating a static air pressure profile on the surface of the fan housing, modifying the opening according to the pressure contours in the simulated static air pressure profile, and re-simulating to determine a new static air pressure profile. In some embodiments, a modified inlet opening can be expanded based on areas of low pressure near an area of maximum air flow velocity adjacent to the fan housing's outlet opening. Preferably the modified inlet opening is not expanded beyond the end of the blade tips of the fan assembly's impeller, which ensures an adequate enclosed area to ensure building air pressure within the fan assembly. Keeping the fan housing's inlet opening inside the impeller blade tips also can improve acoustical performance of the fan assembly in the operating environment.

Figure 6:
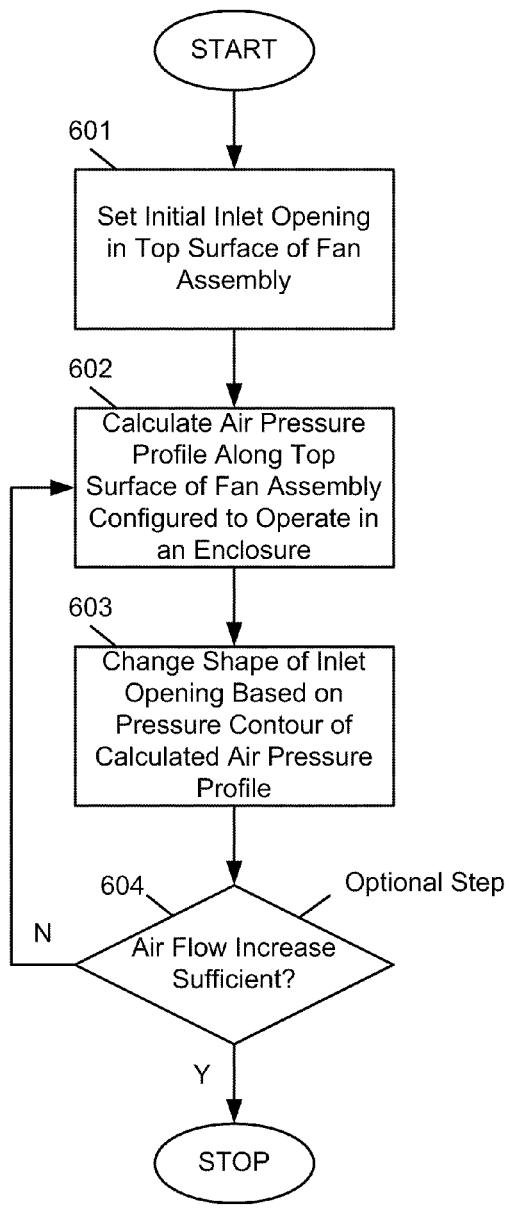
FIG. 6 illustrates a method for forming an inlet opening in the top surface of a fan housing.

FIG. 6 outlines an exemplary embodiment of a method to form an inlet opening in the top surface of a fan housing. In step 601, an initial inlet opening can be set in the top surface of a fan housing. This initial inlet opening can be circular, elliptical, ovate or other pre-determined shape. In step 602, an air pressure profile can be calculated along the top surface of the fan housing configured to operate in an enclosure. The calculation can be performed by a computer aided design simulation that includes surfaces adjacent to the surfaces of the fan assembly to simulate the fan assembly operating in a typical enclosure. For example, the flat surfaces 301 shown in FIG. 3 that surround the fan assembly 302 can represent a typical enclosed environment in which the fan assembly can be configured to operate. In step 603, the shape of the inlet opening can be changed based on one or more pressure contours in the calculated static air pressure profile from step 602. In some embodiments, in step 603, the inlet opening can be enlarged in areas of the top surface of the fan housing with negative air pressure as determined by the calculated static air pressure profile. In other embodiments, the inlet opening can be shaped in step 603 to follow a contour of the calculated static air pressure profile from step 602. In yet more embodiments, the inlet opening can be enlarged in areas of the top surface of the fan housing under which the air speed is estimated to be highest, for example near the outlet opening. Preferably, the inlet opening is changed to increase circulating air flow through the fan assembly. In step 604, an optional iterative repetition of steps 602 and 603 can be determined by evaluating if the air flow increase resulting from the changed inlet opening is sufficient. In some embodiments, a single iteration can be used, and the method can stop after a first completion of steps 602 and 603. In other embodiments, the air pressure profile calculation step 602 can be repeated iteratively, each time using an inlet opening modified by step 603 in a previous iteration. In an exemplary embodiment, the final shape of the inlet opening can be a smoothly continuous, convex curve such as an ellipse or an ovate (egg) shape, with the centroid of the inlet opening offset laterally from the rotational axis of an impeller in the fan assembly. In another embodiment, the inlet opening shape can be asymmetric and consist of a circular arc combined with a non-circular arc to form a smoothly continuous curve.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method for forming an inlet opening in a housing of a fan assembly, the method comprising:
   (a) calculating a static air pressure profile along a top portion of the housing of the fan assembly configured to operate in an enclosure, the fan assembly including
      an impeller mounted on a bottom portion of the housing of the fan assembly,
      a housing sidewall perpendicular to the bottom portion of the housing and enclosing the fan assembly to form an outlet opening along one side, and
      the top portion of the housing of the fan assembly having an inlet opening perpendicular to the outlet opening and positioned over the impeller; and
   (b) changing the shape of a section of the inlet opening in the top portion of the housing of the fan assembly based on a pressure contour of the calculated static air pressure profile.

2. The method of claim 1 wherein the inlet opening shape is changed in an area of the top portion of the housing of the fan assembly having negative air pressure relative to atmospheric air pressure in the calculated static air pressure profile.

3. The method of claim 1 wherein the inlet opening shape is changed to follow one or more of the pressure contours of the calculated static air pressure profile.

4. The method of claim 1 wherein the inlet opening shape is changed in an area of the top surface of the housing of the fan assembly near the outlet opening.

5. The method of claim 1 further comprising:
   (c) repeating iteratively steps (a) and (b) one or more times using the changed inlet opening from previous step (b) when calculating the air pressure contour profile in subsequent step (a).

6. The method of claim 1 wherein the fan assembly is a centrifugal fan.

7. The method of claim 1 wherein the centroid of the changed inlet opening is displaced laterally from a rotational axis of the impeller.

8. The method of claim 4 wherein the changed inlet opening is a non-circular, smoothly convex geometric curve.

9. The method of claim 4 wherein the changed inlet opening includes a circular arc combined with a non-circular arc forming a smoothly continuous geometric curve.

10. The method of claim 5 wherein an interior surface of the fan assembly sidewall follows a smoothly convex geometric curve.

11. An air circulating fan assembly comprising:
    an impeller mounted on a bottom portion of a housing of the fan assembly;
    a housing sidewall perpendicular to the bottom portion of the housing and enclosing the fan assembly to form an outlet opening along one side; and
    a top portion of the housing of the fan assembly having an inlet opening perpendicular to the outlet opening and positioned over the impeller;
    wherein the shape of a section of the inlet opening in the top portion of the housing of the fan assembly is based on a pressure contour of a calculated static air pressure profile along the top portion of the housing of the fan assembly when configured to operate in an enclosure.

12. The fan assembly of claim 11 wherein the inlet opening shape is enlarged in an area of the top portion of the housing of the fan assembly having negative air pressure relative to atmospheric air pressure in the calculated static air pressure profile.

13. The fan assembly of claim 11 wherein a section of the inlet opening shape follows one or more of the pressure contours of the calculated static air pressure profile.

14. The fan assembly of claim 11 wherein the inlet opening shape is enlarged in an area of the top surface of the housing of the fan assembly near the outlet opening.

15. The fan assembly of claim 11 wherein the shape of the section of the inlet opening in the top portion of the housing of the fan assembly is determined iteratively by using a previously determined inlet opening when calculating a subsequent static air pressure profile along the top portion of the housing of the fan assembly.

16. The fan assembly of claim 11 wherein the fan assembly is a centrifugal fan.

17. The fan assembly of claim 11 wherein the centroid of the inlet opening in the top portion of the housing of the fan assembly is displaced laterally from a rotational axis of the impeller.

18. The fan assembly of claim 14 wherein the inlet opening is a non-circular, smoothly convex geometric curve.

19. The method of claim 14 wherein the inlet opening includes a circular arc combined with a non-circular arc forming a smoothly continuous geometric curve.

20. The fan assembly of claim 15 wherein an interior surface of the fan assembly sidewall follows a smoothly convex geometric curve.

* * * * *